United States Patent [19]
Christal

[11] Patent Number: 5,875,403
[45] Date of Patent: Feb. 23, 1999

[54] MOBILE TELEPHONE

[75] Inventor: Philip Christal, Anzing, Germany

[73] Assignee: Siemens Aktiengesellschaft, Munich, Germany

[21] Appl. No.: 610,896

[22] Filed: Mar. 5, 1996

[30] Foreign Application Priority Data

Mar. 6, 1995 [DE] Germany ......................... 195 07 697.4

[51] Int. Cl.⁶ ............................. H04B 1/38; H04M 1/00
[52] U.S. Cl. ........................................... 455/550; 455/566
[58] Field of Search ..................................... 455/550, 566, 455/567, 413, 414, 415, 564, 558, 426, 31.3, 556, 460; 379/354, 355; 340/825.44

[56] References Cited

U.S. PATENT DOCUMENTS 4,394,649  7/1983  Suchoff ................................... 379/354
5,153,582  10/1992 Davis ................................. 340/825.44
5,260,986  11/1993 Pershan ................................ 455/413
5,465,401  11/1995 Thompson ............................. 455/558
5,479,408  12/1995 Will ................................... 340/825.44
5,574,771  11/1996 Driessen et al. ........................ 455/413

FOREIGN PATENT DOCUMENTS 42 33 066   7/1994   Germany .

Primary Examiner—Dwayne D. Bost
Assistant Examiner—Tracy M. Legree
Attorney, Agent, or Firm—Hill & Simpson

[57] ABSTRACT

A mobile telephone according to the invention receives and stores short messages. Those short messages are displayed on a display of the mobile telephone. The operator can confirm a received message with a "yes" response or can send a return short message with an edit function.

4 Claims, 1 Drawing Sheet

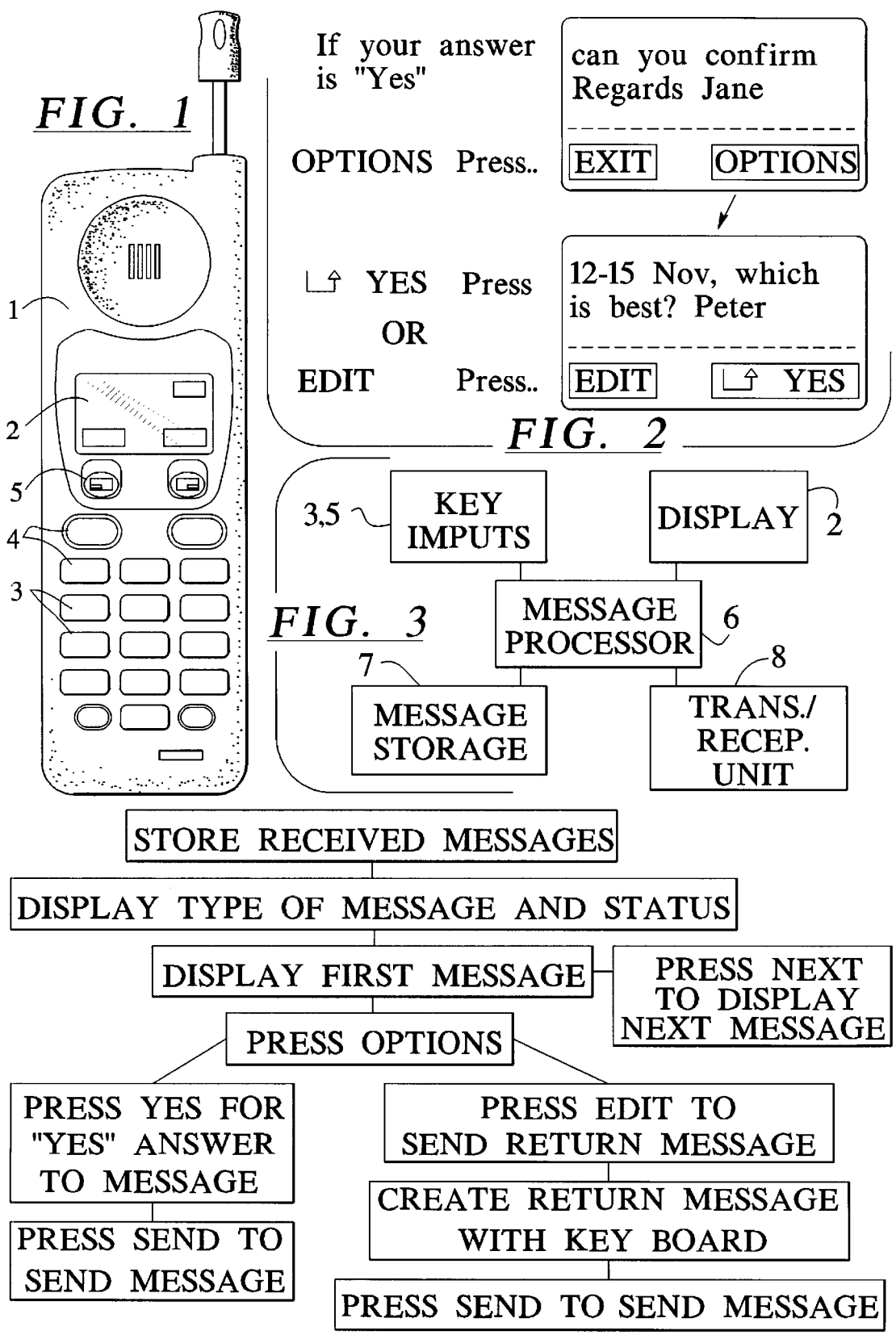

MOBILE TELEPHONE

BACKGROUND OF THE INVENTION

The invention relates to a mobile telephone having a key pad with dialing and function keys and a display window, having further keys (soft keys), as well as a transmission/reception unit integrated into the operating part (handheld), if warranted.

In the GSM (Group Special Mobile), the new mobile radio system, new message services are being introduced. Some are being taken over from other mobile radio systems. These services contain text messages. As can be recognized from other areas of telecommunications, the understanding by the user of the many operational features is problematic at first, which affects user acceptance. Potential human-machine interface problems with message services include the knowledge that there is a new message waiting whose type is to be identified and that is to be made accessible.

In DE 42 33 066 A1, a mobile telephone of the above-named type is specified that, given a message service, comprises a correspondingly marked indication in the display and prompts access to the waiting message. By pushing the corresponding key, the first of the short messages (SMS—Short Message Service) is displayed. This and subsequent messages, as well as previously stored messages are also listed, and can be independently selected, viewed, edited and sent.

The inclusion of further functions is difficult due to the physical characteristics of a handheld having a small display and key pad.

SUMMARY OF THE INVENTION

An object of the invention is to propose a solution for further user-friendly functionalities for a mobile telephone.

This object is achieved according to the invention by means of an implementation of a means for processing and transmitting messages in such a fashion that received messages to be confirmed with a "yes" are sent back to the sender with an affirmative supplement by actuation of a soft key labelled 'yes response'.

A further advantageous design of the mobile telephone is characterized by an implementation of a means for the transmission of a group message so that, upon actuation of a "group" key, a message destined for several receivers is sent in succession to the predetermined number of receivers marked in a phone book of the mobile telephone.

The mobile telephone according to the invention, having self-explanatory operation and user control, has an MMI (Human-Machine Interface) design, which enables a simple processing of messages, transmission and reception, as well as the sending back of received text messages. The short message system (SMS) is here constructed for the first time as SMS MO (SMS mobile originated). Here messages are originally generated in the mobile telephone. This occurs through a minimal number of keystrokes and without requiring a special user keyboard. The benefits of an existing handset MMI having a graphic display and two soft keys are thereby expanded.

In the following, the invention is described in more detail by means of the exemplary embodiments represented in the drawing.

BRIEF DESCRIPTION OF THE DRAWINGS

FIG. 1 is a front view of the mobile telephone having the short message response features according to the invention;

FIG. 2 illustrates a short message display of the mobile telephone of FIG. 1 for displaying a message and displaying a response to a message;

FIG. 3 is a block diagram of the short message system according to the invention; and FIG. 4 is a flow chart of a program of the message processor of FIG. 3.

DESCRIPTION OF THE PREFERRED EMBODIMENTS

FIG. 1 shows a handheld 1 in a top view, comprising on its top side a display 2 and a key pad having dialing keys 3 and information keys 4 as well as two further soft keys 5, by means of which the functions are called.

A series of mobile telephones may receive short messages and some may meanwhile also send a message. The present mobile telephone also has the possibility of originally generating messages in the mobile telephone, i.e. without the use of additional means such as a PC. This service is advantageously implemented by means of the soft keys, the graphic display and the intelligent teaching system.

An essential feature of the mobile telephone according to the invention concerns the "yes response." Many messages are simple yes or no questions for the confirmation of agreements, etc. For this purpose it is provided that at the end of an incoming SMS message the user is prompted to produce a yes-response to indicate agreement. In the case of such a decision, the message is sent back to the sender. For this purpose, through pressing a soft key "options", and then pressing "yes", an affirmative supplement, for example "response is yes," is appended to the message, as well as the user's own call number if warranted; by pressing the "send" key the message is then sent back to the original sender. If the response is "no," instead of sending a no-response it is probably better to call in order to explain the response or to suggest alternatives. It is possible that the content of a message should be modified before it is sent back or relayed. In this case, at the end of the message one should proceed as follows: press the soft key "options" and press "edit" (see FIG. 2). The target call number can then be altered or confirmed. After that, a cursor appears at the top left of the graphic display. The message can now be processed in the desired manner. The writing of messages can take some time. In order to reduce this task to a minimum, models can be produced. These can be constructed from incoming messages and can be stored, processed and sent as needed.

FIG. 3 shows a block diagram of principle components of the message processing system according to the invention. The message processor 6 is a computer which is programmed according to the logic flow chart shown in FIG. 4. The message processor 6 is contained within the mobile telephone and receives its inputs from the key inputs including the dialing keys 3 and soft keys 5. The message processor controls output onto the display 2. A message storage 7 connects to the message processor for storing a plurality of short messages. The transmission/reception unit 8 sends and receives the short messages and connects with the message processor 6.

FIG. 4 shows a flow chart for the programming of the message processor 6. The various steps in this flow chart have been previously described above and illustrate steps of the basic short message system for displaying short messages as described in DE 42 33 066 A1, and the answer back steps explained above with respect to FIG. 2.

A further advantageous embodiment of the mobile telephone according to the invention consists in that messages are sent in succession to some receivers. This could involve for example members of a work team, or the communication of appointments or offers to several persons. For this purpose a "group" key is provided, offered as part of the usual message-sending process. By pushing this key, the sending of the message in succession to the predetermined receivers is effected. The MMI enables the generation of a group by marking the corresponding subscribers in a directory (phone book) of the mobile telephone.

Although various minor changes and modifications might be proposed by those skilled in the art, it will be understood that my wish is to include within the claims of the patent warranted hereon all such changes and modifications as reasonably come within my contribution to the art.

I claim as my invention:

1. A mobile telephone, comprising:

a transmission/reception unit having a send key connected thereto;

a message processor having connected to it a message storage, a display, said transmission/reception unit, dialing keys, an options key, a yes key, and an edit key; and said message processor, after storing a received message in said message storage, when the options key is pressed and thereafter if the operator presses the yes key, then a "yes" is appended to the message and the message with the appended "yes" is then sent when the send key is pressed, or if after pressing the option key the edit key is then pressed, then the operator may alter or confirm a target call number for the message, the message may then be edited by visualizing the message on the display and using dialing keys to alter the message, and then the message is sent by pressing the send key.

2. The mobile telephone according to claim 1 wherein a group key is also connected to the message processor, and the message processor, when the group key is pressed, sends the message either with the appended yes or in altered form to a plurality of target call numbers.

3. The mobile telephone according to claim 1 wherein a group key is connected to the message processor, and the message processor, upon pressing the group key, causes transmission of a group message destined for several receivers in succession in accordance with receivers marked in a phone book of the mobile telephone.

4. The mobile telephone according to claim 1 wherein the message storage stores models for generation and processing of messages.

* * * * *